(12) United States Patent
Kishi et al.

(10) Patent No.: US 8,077,359 B2
(45) Date of Patent: Dec. 13, 2011

(54) IMAGE PROCESSING SYSTEM AND IMAGE FORMING APPARATUS INCORPORATING SAME

(75) Inventors: Yumiko Kishi, Yokohama (JP); Toshio Ohide, Atsugi (JP); Tatsuo Ohyama, Kawasaki (JP); Hidetoshi Yamashita, Kawasaki (JP); Nobuyoshi Kaima, Machida (JP)

(73) Assignee: Ricoh Company Limited, Tokyo (JP)

( * ) Notice: Subject to any disclaimer, the term of this patent is extended or adjusted under 35 U.S.C. 154(b) by 522 days.

(21) Appl. No.: 12/137,072

(22) Filed: Jun. 11, 2008

(65) Prior Publication Data

US 2008/0309951 A1 Dec. 18, 2008

(30) Foreign Application Priority Data

Jun. 12, 2007 (JP) ................................ 2007-154631

(51) Int. Cl.
*G06T 5/00* (2006.01)

(52) U.S. Cl. .......................... 358/3.26; 358/2.1; 395/139

(58) Field of Classification Search ................. 358/3.26, 358/2.1; 395/139
See application file for complete search history.

(56) References Cited

U.S. PATENT DOCUMENTS

| 5,329,614 | A | * | 7/1994 | Kidd et al. ..................... 345/671 |
| 5,608,853 | A | * | 3/1997 | Dujari et al. .................. 345/668 |
| 6,731,400 | B1 | * | 5/2004 | Nakamura et al. ............. 358/1.9 |

FOREIGN PATENT DOCUMENTS

| JP | 3539283 | 4/2004 |
| JP | 2005-117615 | 4/2005 |
| JP | 2007-008132 | 1/2007 |

* cited by examiner

*Primary Examiner* — Twyler Haskins
*Assistant Examiner* — Michael Burleson
(74) *Attorney, Agent, or Firm* — Oblon, Spivak, McClelland, Maier & Neustadt, L.L.P.

(57) ABSTRACT

A novel image processing system includes a pixel position indicator and a pixel inserting unit. The pixel position indicator is configured to indicate insertion positions in the image data. The pixel inserting unit is configured to enlarge a size of the image data by inserting an additional pixel at each of the insertion positions and accordingly shifting the original pixels in a given direction. The additional pixel has a value lower than a given threshold. Each insertion position is at an approximate center of an area formed of pixels having values higher than the given threshold. A novel image forming apparatus incorporates such an image processing system and an electrophotographic system. The electrophotographic system is configured to form an image by irradiating a photoconductive surface with a laser beam according to the processed image data.

18 Claims, 11 Drawing Sheets

IMAGE PROCESSING SYSTEM AND IMAGE FORMING APPARATUS INCORPORATING SAME

CROSS-REFERENCE TO RELATED APPLICATIONS

The present patent application claims priority under 35 U.S.C. §119 from Japanese Patent Application No. 2007-154631 filed on Jun. 12, 2007, the entire contents of which are hereby incorporated by reference herein in their entirety.

BACKGROUND OF THE INVENTION

1. Field of the Invention

The present invention relates to an image processing system and an image forming apparatus incorporating same, and more particularly, to an image processing system that enlarges image size by inserting additional pixels in an original image, and an image forming apparatus incorporating such an image processing system.

2. Discussion of the Background

As electrophotographic technologies have developed to provide high speed, high definition, and high performance image forming systems, modern image data processors are required to cope with various issues arising from the high quality requirements of such electrophotographic systems.

One issue faced by an image data processor employed in an electrophotographic system is the occurrence of errors such as image misalignment or misregistration, which result when multiple images are formed on a single sheet-like recording medium (hereinafter also "recording sheet").

Image misalignment takes place in printers featuring an automatic duplex mode, where images are successively created and melted on to both sides of a single recording sheet. As a recording sheet tends to shrink slightly when heated, heat application between successive passes causes slight but noticeable misalignment of the images printed on opposite sides of the same sheet. Such a defect seems to issue from the faster processing speeds and compactness typical of modern electrophotographic printers, which reduces a time or a space interval between successive image formations in the duplex printing mode.

Image misregistration occurs where a full color image is produced by superimposition of sub-images of distinct colors formed by multiple electrophotographic units. Such errors are commonly encountered by high speed color printers that employ a tandem architecture for reducing processing time.

One solution to such misalignment and misregistration defects is to use a scaling function, which adjusts image size by electrophotographically adding or deleting picture elements (pixels) to or from an original image before creating a final image.

FIG. 1 is a schematic illustration of an example of scaling operation where image size is enlarged by adding new pixels.

In FIG. 1, two-dimensional arrays 600 and 610 are corresponding portions of pixel matrices or image data before and after a scaling operation, where each square cell represents one pixel, "X" or horizontal direction indicates a main scan direction, and "Y" or vertical direction indicates a sub-scan direction.

In the scaling operation, a single row of additional pixels is inserted after every ten rows or scan lines of the image data 600 to shift the original pixels in the sub-scan direction Y. This obtains the resulting image data 610 vertically enlarged, with the rows of added pixels 612 periodically appearing in the pixel matrix. When used in electrophotographic printers, such a scaling function enables fine adjustment of image size in a desired direction, thereby effectively preventing misalignment or misregistration.

A drawback of such a size adjusting method is that the scaled image tends to suffer from an undesirable pattern of streaks, a print defect commonly known as "banding".

Generally, artifacts on a printed image such as banding and moiré patterns result from periodic density variations due to various causes, including periodic insertion or deletion of pixels in the image data. As the human eye is most sensitive to repeating parallel lines with spatial frequencies ranging from 5 to 10 cycles per degree (cpd), equivalent to 0.8 to 1.6 cycles per millimeter (cpm) at a viewing distance of 350 millimeters, density variations periodically appearing at such frequencies are perceived as a defect on a printed image.

In the case of the scaling operation depicted in FIG. 1, an image can be scaled up to 102% by inserting one scan line after every 48 scan lines. However, when the image has a resolution of 1,200 dots per inch, such pixel insertions translate into density variations in the printed image occurring at approximately 1 cpm, which falls within the range of perception to cause a noticeable banding defect.

Consequently, it is desirable to compensate for periodic variations when processing image data for output to an imaging system, and for this purpose, various techniques have been proposed in the field of image data processing.

One known method provides an electrophotographic color image forming apparatus with an offset detector and a compensation circuit. When a full color image is created by superimposition of multiple sub-images originating from different imaging stations, the offset detector detects an amount of displacement for each sub-image using a reference pattern. Based on the offset information derived from the offset detector, the compensation circuit calculates a number of pixels to be added to compensate for the displacement amount. Pixels are randomly inserted in image data by the calculated amount, so that the multiple sub-images have substantially the same width along a scan direction. According to this method, a defect-free color image may be obtained with no periodic variation present in any direction.

Another known method proposes a color image forming apparatus with a registration capability, where a screening unit processes image data with a halftone screen and a registration unit serves to compensate for misregistration by adding or deleting a given sequence of pixels in the processed image data. When the screening unit applies halftone screens of different frequencies to different portions of an original image, the registration unit correspondingly adjusts the frequency at which to insert or delete pixels so that the screen frequency and the insertion/deletion frequency do not coincide with each other at least within a range of 0.5 millimeters in the resulting image.

Unfortunately, these conventional methods require complex calculations and significant memory capacity in determining where to insert or delete pixels in the image data, increasing manufacturing cost of a printing system implementing the size adjustment capability.

Therefore, it would be advantageous to have a cost-effective, low memory consumption image processor for use in electrophotographic systems, capable of adjusting image size without causing significant loss of image quality. An electrophotographic image forming apparatus incorporating such an image processor can provide high quality images with enhanced performance and reduced manufacturing cost.

SUMMARY OF THE INVENTION

Exemplary aspects of the present invention are put forward in view of the above-described circumstances, and provide a novel image processing system used to process image data formed of multiple original pixels.

Other exemplary aspects of the present invention provide a novel image forming apparatus.

In one exemplary embodiment, the novel image processing system includes a pixel position indicator and a pixel inserting unit. The pixel position indicator is configured to indicate insertion positions in the image data. The pixel inserting unit is configured to enlarge a size of the image data by inserting an additional pixel at each of the insertion positions and accordingly shifting the original pixels in a given direction. The additional pixel has a value lower than a given threshold. Each insertion position is at an approximate center of an area formed of pixels having values higher than the given threshold.

In one exemplary embodiment, the image forming apparatus includes an image processing system and a electrophotographic system. The novel image processing system is configured to process image data formed of multiple original pixels, and includes a pixel position indicator and a pixel inserting unit. The pixel position indicator is configured to indicate insertion positions in the image data. The pixel inserting unit is configured to enlarge a size of the image data by inserting an additional pixel at each of the insertion positions and accordingly shifting the original pixels in a given direction. The additional pixel has a value lower than a given threshold. Each insertion position is at an approximate center of an area formed of pixels having values higher than the given threshold. The electrophotographic system is configured to form an image by irradiating a photoconductive surface with a laser beam according to the processed image data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
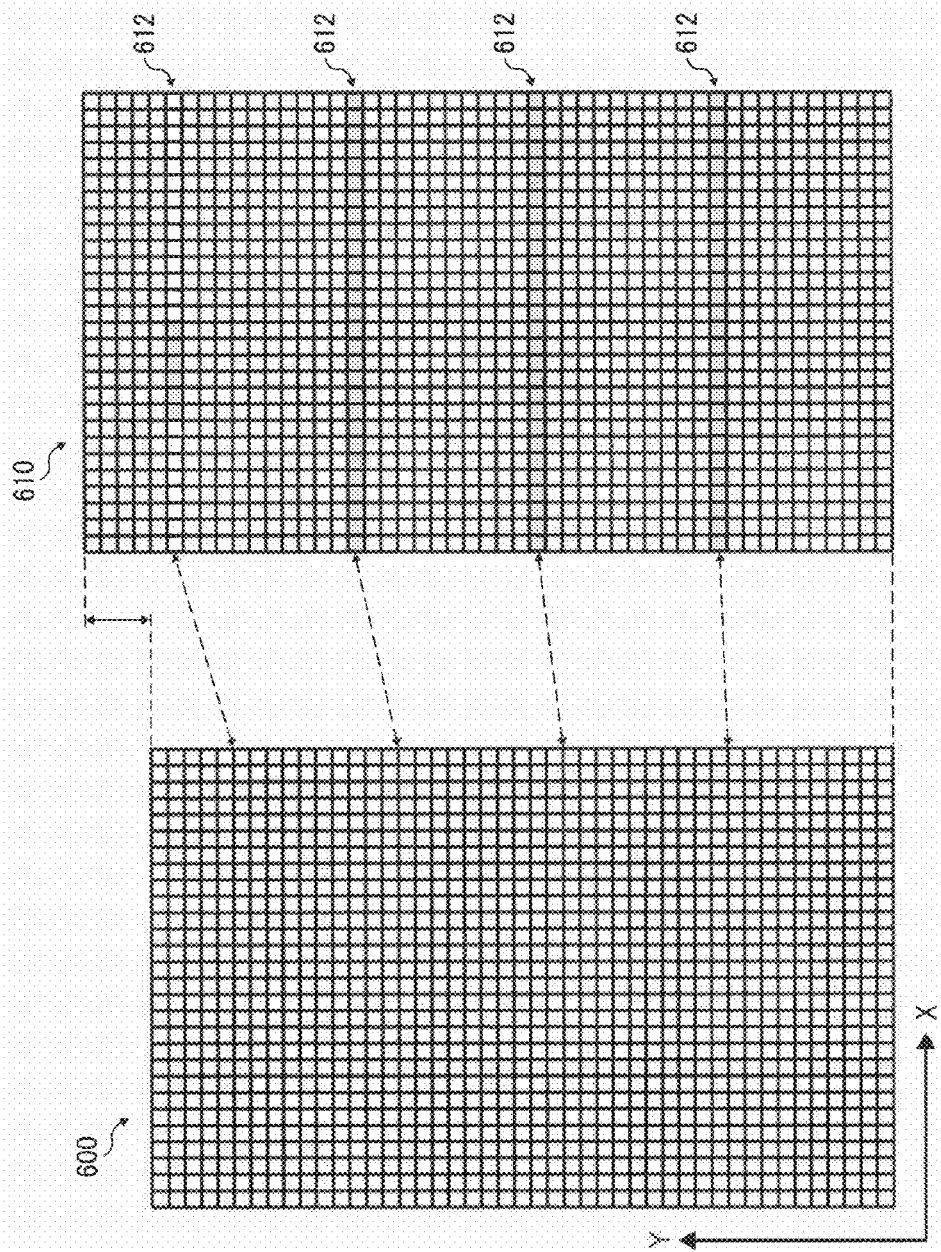
FIG. 1 is a schematic illustration of an example of a conventional scaling operation where image size is enlarged by adding new pixels.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, exemplary embodiments of the present patent application are described.

Figure 2:
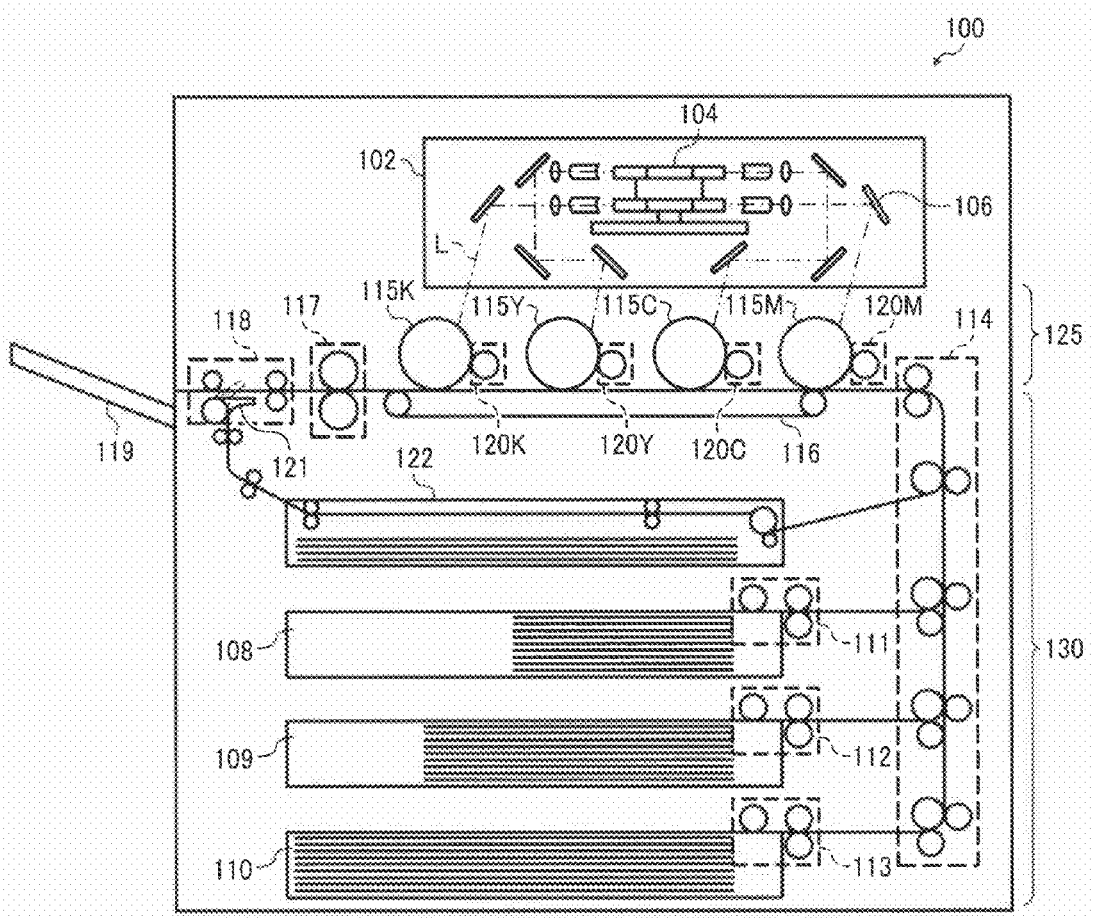
FIG. 2 is a schematic illustration of an image forming apparatus according to one embodiment of this patent specification.

FIG. 2 is a schematic diagram illustrating an image forming apparatus 100 according to one embodiment of this patent specification.

As shown in FIG. 2, the image forming apparatus 100 includes an optical unit 102, an electrophotographic unit 125, and a sheet feed unit 130. The image forming apparatus 100 is configured as a multifunctional apparatus with multiple image processing capabilities, such as copying, faxing, scanning, printing, and the like.

In the image forming apparatus 100, the optical unit 102 includes a polygon mirror 104, reflecting mirrors 106, and other optical components, such as laser sources, cylindrical lenses, and imaging lenses, not shown.

The electrophotographic unit 125 includes drum-shaped photoconductors 115K, 115Y, 115M, and 115C, development devices 120K, 120Y, 120M, and 120C, and other components working in cooperation to form electrophotographic toner images.

The sheet feed unit 130 includes sheet cassettes 108, 109, and 110, sheet feeders 111, 112, and 113, a feed path 114, a transfer belt 116, a fixing device 117, an ejection device 118, an output tray 119, a diverter 121, and a sheet refeeder 122. The sheet cassettes 111 through 113 each contains a stock of recording sheets made of paper, plastic, or the like.

Although not depicted in the drawing, the image forming apparatus 100 includes an appropriate image data source from which image data to be processed is obtained. For example, the image forming apparatus 100 may have an image scanner featuring an automatic document feeder (ADF), which automatically feeds original documents for either single or double-sided scanning in contact with a platen glass.

In the optical unit 102, the laser sources driven by a control system, not shown, generate laser beams L according to image data for forming sub-images of different toner colors K, Y, M, and C. In the following description, suffix letters "K", "Y", "M", and "C" assigned to reference numerals refer to particular toner colors as well as components associated with such toner colors, where "K" denotes black, "Y" for yellow, "M" for magenta, and "C" for cyan. These suffixes will be omitted where the statements presented are equally applicable to all the components designated by the same reference numeral.

Each laser beam L is converged by the cylindrical lens, and deflected to the reflecting mirror 106 as the polygon mirror 104 rotates. The reflecting mirror 106 then reflects the laser beam L so that the laser beam L exit the optical unit 102 and enter the electrophotographic unit 125.

In the electrophotographic unit 125, each laser beam L scans the surface of the photoconductor 115. As the photoconductor 115 rotates, this generates, scan line by scan line, a latent image extending in main scan and sub-scan directions. In the ensuing description, "main scan direction" refers to the direction in which the laser beam L scans, "sub-scan direction" refers to the direction perpendicular to the main scan direction, and "scan line" refers to a single line traced by the laser beam L along the surface of the photoconductor 115 in the main scan direction. The laser beam L has a spot diameter on the photoconductor surface defined in terms of the scan directions, at which the beam intensity drops to, for example, approximately $1/e^2$ of a maximum value.

The photoconductor 115 continues to rotate to deliver the latent image to the adjacent development device 120, which develops the latent image into visible form using toner. The developed sub-image further travels on the photoconductive surface for subsequent transfer processing.

In the sheet feed unit 130, a recording sheet is fed from one of the sheet cassettes 108, 109, and 110 by a corresponding one of the sheet feeders 111, 112, and 113. The fed sheet advances along the feed path 114 to reach the transfer belt 116, across which an electric field is applied to hold the sheet traveling thereon.

The transfer belt 116 conveys the sheet past the photoconductors 115M, 115C, 115Y, and 115K, where the developed sub-images are sequentially transferred in registration to the sheet surface, superimposed one atop another, to form a multicolor image.

Thereafter, the sheet enters the fixing unit 117. The fixing unit 117 includes, for example, a fixing roller made of silicone rubber, fluorocarbon rubber, or the like, and fixes the multicolor image on the sheet by applying heat and pressure. It should be noted that, during this fixing process, the recording sheet made of paper, plastic, or the like can shrink slightly when heated. As will be described later, the image forming apparatus 100 according to this patent specification can adjust the size of produced images to compensate for such shrinkage of a recording medium.

After the fixing process, the ejection device 118 directs the sheet to an appropriate destination depending on whether simplex or duplex printing is required. In simplex mode, the recording sheet is ejected to the output tray 119 with the diverter 121 pressed down. In duplex mode, the recording sheet is guided to the sheet refeeder 122 with the diverter 121 lifted up. The sheet refeeder 122 feeds the incoming sheet to the feed path 130 for printing on another side. After the duplex printing, the recording sheet again enters the ejection device 118 and is ejected to the output tray 119.

Figure 3:
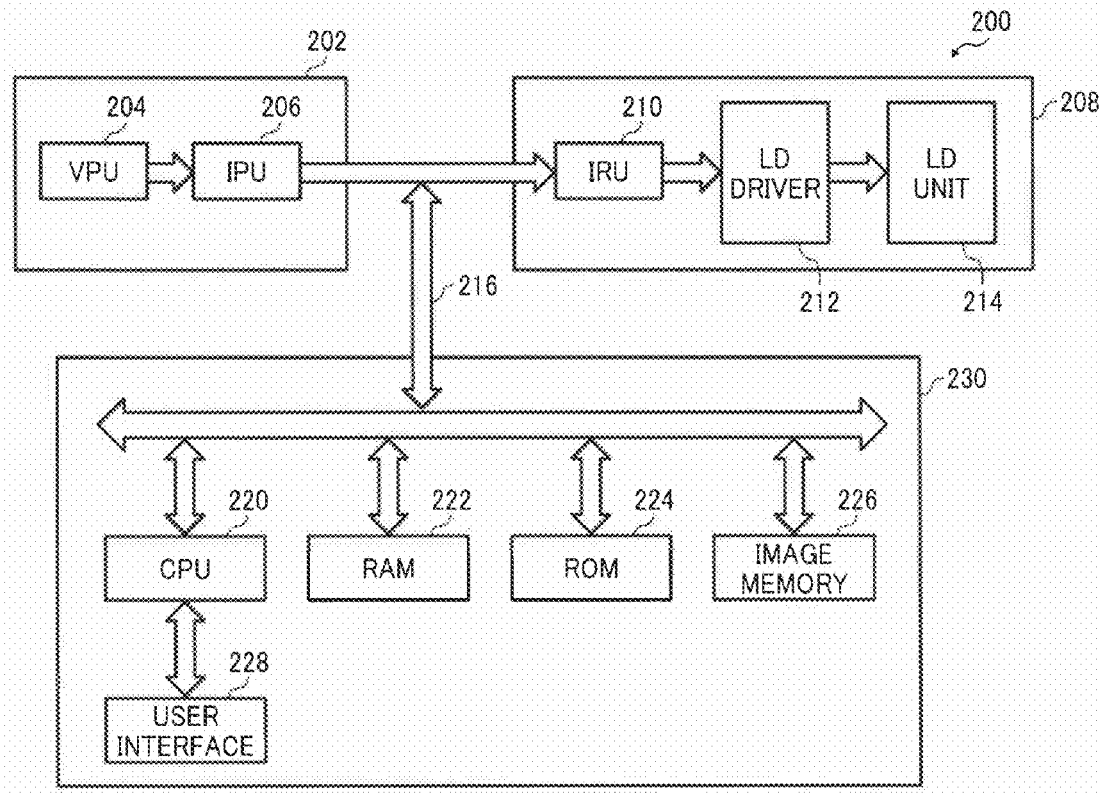
FIG. 3 is a block diagram schematically illustrating a control system of the image forming apparatus of FIG. 2.

Referring to FIG. 3, a block diagram schematically illustrating a control system 200 of the image forming apparatus 100 is described.

As shown in FIG. 3, the control system 200 includes a scan controller 202, a print controller 208, and a main controller 230. The main controller 230 communicates with the scan controller 202 and the print controller 208 via a bidirectional interface 216.

The scan controller 202 includes a video processing unit (VPU) 204 and an image processing unit (IPU) 206, and communicates with a scanner, not shown, which provides an analog signal representing an original image.

In the scan controller 202, the VPU 204 receives and digitizes analog data of a scanned image. The digital data is subjected to certain processes, such as black point adjustment, shading correction, and alignment of picture elements (pixels). Then, the IPU 206 processes the image data for storage or for communication to the print controller 208.

The print controller 208 includes an image rendering unit (IRU) 210, a laser driver 212, and a laser diode (LD) unit 214 having a semiconductor laser source. Any appropriate electronic circuitry may be used to implement the IRU 210, including a gate array or an application specific integrated circuit (ASIC).

In the print controller 208, the IRU 210 receives image data from an appropriate data source, including the scan controller 202, the main controller 230, or a host computer connected to the control system 200. Based on the image data, the IRU 210 generates a scan control signal that controls operation of the LD driver 212 and the LD unit 214. When activated, the LD driver 212 regulates power supplied to the LD unit 214 so that the laser source emits light for illuminating the photoconductive surface according to the provided image data.

The operations of the scan controller 202 and the print controller 208 are controlled by the main controller 230. The main controller 230 includes a central processing unit (CPU) 220, a read only memory (ROM) 224, a random access memory (RAM) 222, and an image memory 226, all of which are interconnected by a system bus. The CPU 220 is connected to a user interface 228 allowing a user to interact with the control system 200.

The main controller 230 may implement a parallel or serial interface, such as IEEE 1294 and universal serial bus (USB), as well as a network interface for connection to an Ethernet network.

In the main controller 230, the CPU 220 generates various instructions that control overall operation of the control system 200. The CPU 220 may be any known or later developed device or system with computing capabilities, including PENTIUM® processors or compatibles thereof.

The ROM 224 stores data used by the CPU 220 for computation, such as default settings, control parameters, computer programs, and the like. The RAM 222 provides temporary storage for processing by the CPU 220, and the image memory 226 is dedicated to storage of image data. The user interface 228 serves to receive information from a user, allowing input of a request for a service, such as copying, faxing, scanning, or image storage, as well as specification of various parameters for image formation, such as which sheet feeder to use, image density, simplex or duplex mode printing, number of copies, etc. The input information is transmitted to the CPU 220, which then calls up a corresponding program module to perform a function in accordance with the user's request.

For example, when a request is made to start copying a document, the CPU 220 first directs the scan controller 202 to perform scanning. The scan controller 202 outputs scanned data with user-specified parameters to the print controller 208. The CPU 220 then directs the print controller 208 to print an image based on the provided information.

The IRU 210 interprets the image data scan line by scan line to output a control signal so that the LD unit 214 writes the image data scan line by scan line on the photoconductive surface. The CPU 220 outputs a reference signal so that the scanning is properly done on the photoconductive surface moving in the sub-scan direction. The resulting electrostatic latent image is used to obtain a final image through subsequent electrophotographic processes.

Figure 4:
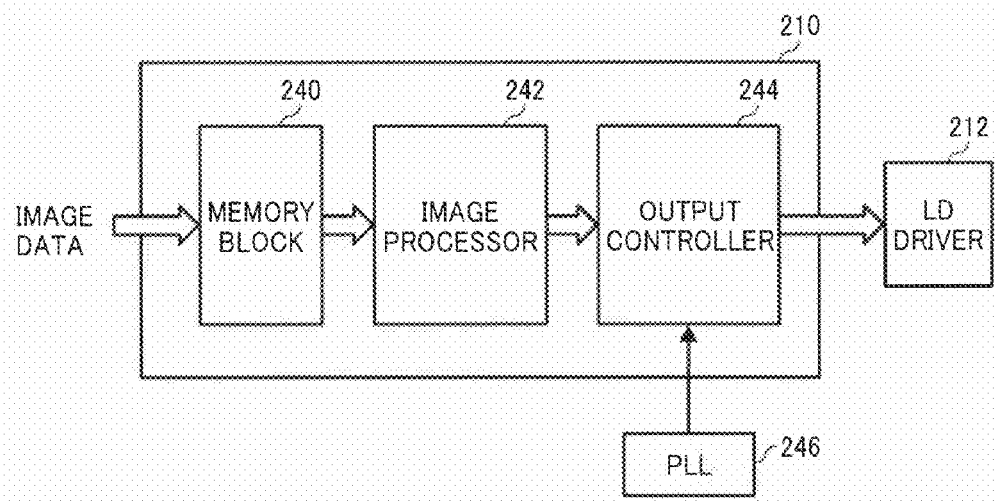
FIG. 4 is a block diagram illustrating in detail an image rendering unit of a print controller included in the control system of FIG. 3.

FIG. 4 is a block diagram illustrating in detail the IRU 210 of the print controller 208.

As shown in FIG. 4, the IRU 210 includes a memory block 240, an image processor 242, and an output controller 244.

In the IRU 210, the memory block 240 performs clock and format conversions on incoming image data. The memory block 240 stores the resulting data for retrieval by the image processor 242.

The image processor 242 makes modifications to the image data retrieved, such as resolution conversion, digital halftoning or screening, and size adjustment by insertion of additional pixels as will be described later in more detail.

The image data thus obtained is organized in addressable pixels each defining a particular position on the photoconductive surface in both the main scan and sub-scan directions. The image processor 242 transmits the pixel data to the output controller 244.

Then, based on the image data, the output controller 244 generates a control signal whose frequency is controlled scan line by scan line by the PLL 246. The timed control signal is directed to the laser driver 212, which in turn generates a corresponding drive signal to control ON-time of the laser source in the LD unit 214.

Figure 5:
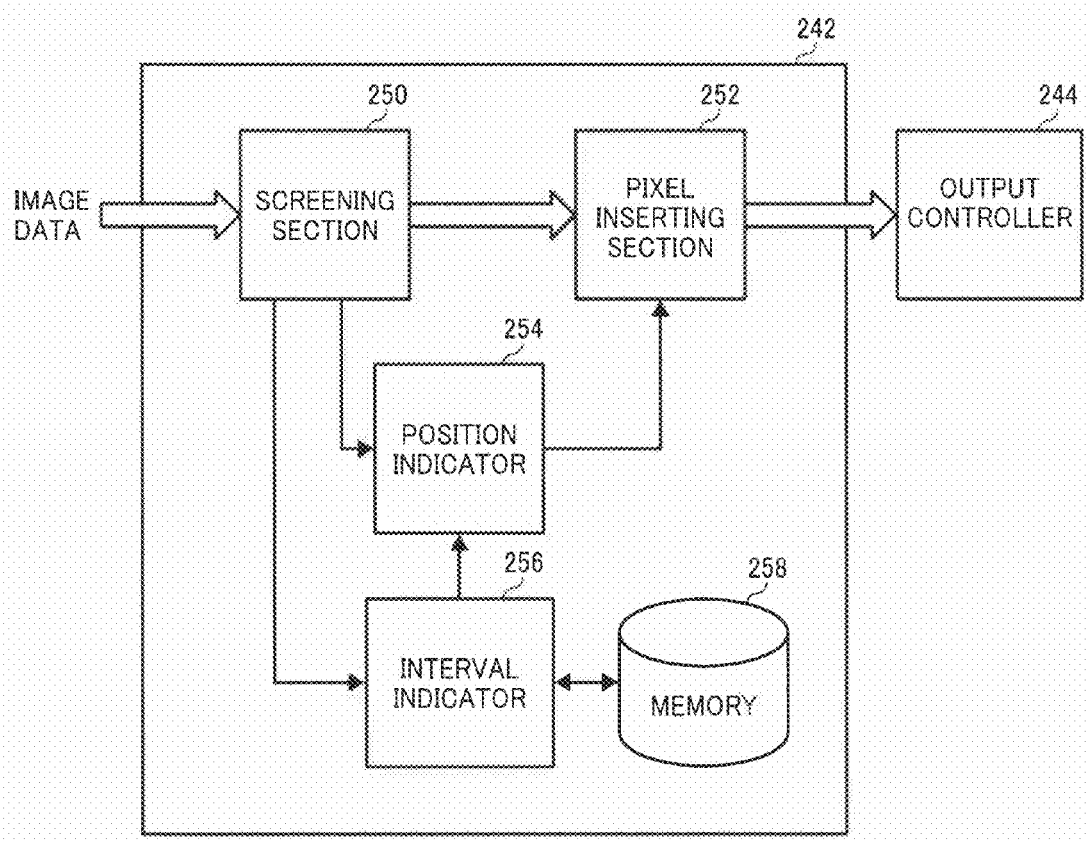
FIG. 5 is a block diagram illustrating one embodiment of an image processor according to this patent specification.

Referring now to FIG. 5, a block diagram illustrating one embodiment of the image processor 242 according to this patent specification is described.

As shown in FIG. 5, the image processor 242 includes a screening section 250, a pixel inserting section 252, a position indicator 254, an interval indicator 256, and a memory 258.

During operation, the image processor 242 receives continuous tone multilevel image data. The supplied image data first enters the screening section 250.

The screening section 250 converts the image data into a binary representation in a given pixel matrix, using a halftone screen of a regularly repeated arrangement of dots or lines represented by black foreground pixels and white background pixels. This procedure is done for each primary color contained in the image data.

Subsequent to the screening process, the screening section 250 provides attribute values describing the screen pattern used (e.g., type, angle, frequency, etc.) to the position indicator 254 and the interval indicator 256. The screening section 250 also provides phase information of the screen pattern to the position indicator 254, indicating where pixels forming lines or dots of the screen pattern appear in the pixel matrix.

The binary data obtained by the screening process is directed to the pixel inserting section 252, which serves to enlarge the size of the image data according to a given scale factor. Such a scaling operation is performed in cooperation with the position indicator 254, the interval indicator 256, and the memory 258.

The memory 258 includes a look-up table storing scale factors used for the scaling operation. Preferably, such scale factors are given in terms of the main scan and sub-scan directions, respectively. In practice, the look-up table provides a list of scale factors calculated for different types of recording sheets with estimated shrinkage, in which case an appropriate scale factor can be retrieved by giving the type of recording medium being used.

The interval indicator 256 derives an appropriate scale factor from the memory 258 to determine an interval at which additional pixels are to be inserted in the pixel matrix by calculation based on the scale factor, the attribute data, and the image resolution. Alternatively, such determination may be based on a look-up table, which provides a list of insertion intervals associated with given representative values for the calculation parameters.

The insertion interval determined is output to the position indicator 254. The position indicator 254 specifies a position at which to insert additional pixels in the pixel matrix based on the insertion interval and on the attribute data and phase information supplied from the screening section 250. The position information is then output to the pixel inserting section 254.

Receiving the image data from the screening section 250 and the position information from the position indicator 254, the pixel inserting section 252 inserts additional pixels at the insertion positions and correspondingly shifts original pixels in the scaling direction. The image data thus enlarged is transmitted to the output controller 244 to generate a laser control signal.

Figure 6:
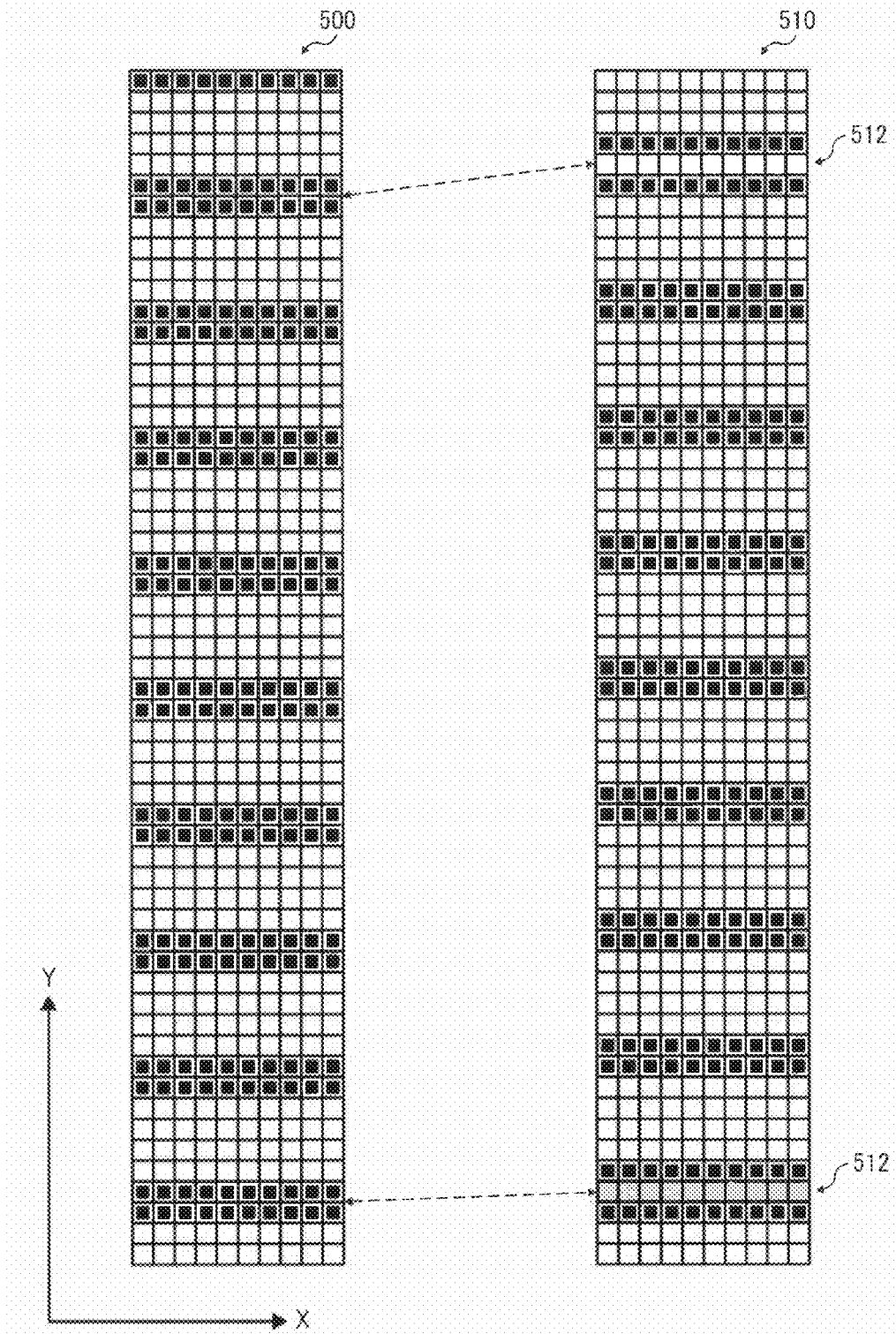
FIG. 6 schematically illustrates an example of a scaling operation performed by the image processor of FIG. 5.

FIG. 6 schematically illustrates an example of the scaling operation performed by the image processor 242.

In the following description, image data is represented by a grid of square cells representing a two-dimensional array of pixels or pixel matrix, where filled-in cells denote pixels with intensity or tone values exceeding a given threshold, i.e., the pixels to be toned (hereinafter "foreground pixels"), blank cells denote pixels with intensity or tone values below the given threshold (hereinafter "background pixels"), and shaded cells denote pixels that are additionally inserted by the scaling operation. In the drawing, the horizontal row or "X" direction corresponds to the main scan direction, and the vertical column or "Y" direction corresponds to the sub-scan direction. For simplicity, the resolution of image data presented is assumed to be identical in both the X and Y directions, but it should be appreciated that the scaling operation according to this patent specification may also be applied to image data having different vertical and horizontally resolutions.

In FIG. 6, a cell grid 500 represents a portion of image data supplied to the pixel inserting section 252 after screening with a parallel line pattern, and a cell grid 510 represents a corresponding portion of the image data which is vertically enlarged through pixel insertion.

The original data 500 is assumed to have a resolution of 1,200 dots per inch (dpi) along the X and Y directions and a screen frequency of 200 lines per inch (lpi) along the Y direction, so that the line pattern has a period of 6 lines including 2 lines of foreground pixels forming an image area. The image data 500 is enlarged to the image data 510 at a scale factor of approximately 102% in the Y direction by inserting lines of additional background pixels 512 after 8 periods of the screen pattern, so that each inserted line is at an approximate center of the image area.

With reference to FIG. 5, the scaling operation of the image processor 242 is described in detail, where "scaling direction" indicates the direction in which the image data is enlarged, "pattern length n" refers to the number of pixels within one period of the halftone screen in the scaling direction, "image pattern length M" refers to the number of foreground pixels within one period of the halftone screen in the scaling direction, and "insertion interval N" refers to the number of times the periodic screen pattern appears between two consecutive pixel insertions. For example, in the case of FIG. 6, the scaling direction is Y, the pattern length n is 6, the image pattern length M is 2, and the insertion interval N is 8.

In the scaling operation, the interval indicator 256 first determines the pattern length n from the resolution and the screen frequency, and calculates the insertion interval N from the pattern length n and a specified scale factor. Although not limited thereto, when one pixel is added each pixel insertion, the insertion interval N can be obtained by substituting n and C in the following expression:

$$C = \{1 + 1/N*n\} * 100 [\%]$$

The pattern length n and the insertion interval N thus obtained are output to the position indicator 254. The position indicator 254 identifies the insertion position based on the pattern length n, the attribute data, and the phase information of the screen pattern, and provides the timing of pixel insertion to the pixel inserting section 252 handling the image data.

Specifically, the position indicator 254 acquires the image pattern length M and divides M by 2 to obtain an integer quotient Q=[M/2]. Every N-th period of the halftone screen, the position indicator 254 signals the pixel inserting section 252 to add one pixel between the Q-th and (Q+1)-th pixels in the scaling direction. The insertion position thus specified is at an approximate center of an image area formed by foreground pixels in the pixel matrix. According to the position indication, the pixel inserting section 252 inserts one background pixel at the specified position.

The scaling operation described above is advantageous in that the determination of insertion position can be performed without requiring complex calculations or significant memory capacity. Although only one insertion interval N is used in FIG. 6, it is contemplated that different insertion intervals $N_1$ and $N_2$ be used in conjunction to more precisely adjust the image size in the image processor 242.

Figure 7:
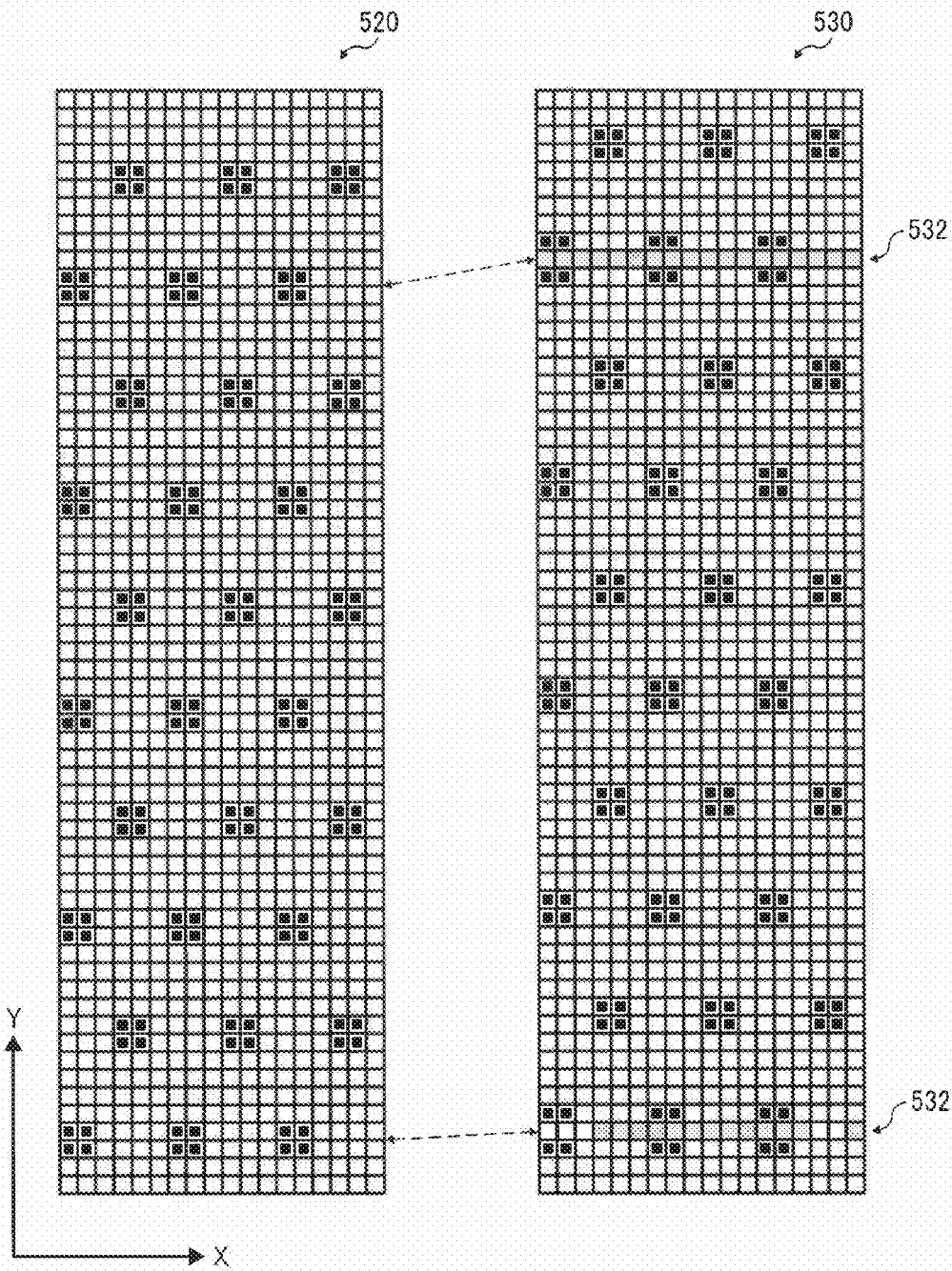
FIG. 7 schematically illustrates another example of a scaling operation performed by the image processor of FIG. 5.

FIG. 7 schematically illustrates another example of the scaling operation performed by the image processor 242.

In FIG. 7, a cell grid 520 represents a portion of image data supplied to the pixel inserting section 252 after screening with a dot pattern, and a cell grid 530 represents a corresponding portion of the image data which is vertically enlarged through pixel insertion.

The original data 520 is enlarged to the image data 530 at a scale factor of approximately 102% in the Y direction by inserting lines of additional background pixels 532 after 8 periods of the screen pattern so that each inserted pixel is at an approximate center of the image area.

It is to be noted that, in the image data 530, the pixel lines 532 are inserted between lines containing both image and background pixels. The example of FIG. 7 thus shows that the insertion position specified by the position indicator 254 may be either between foreground pixels or between background pixels.

Figure 8:
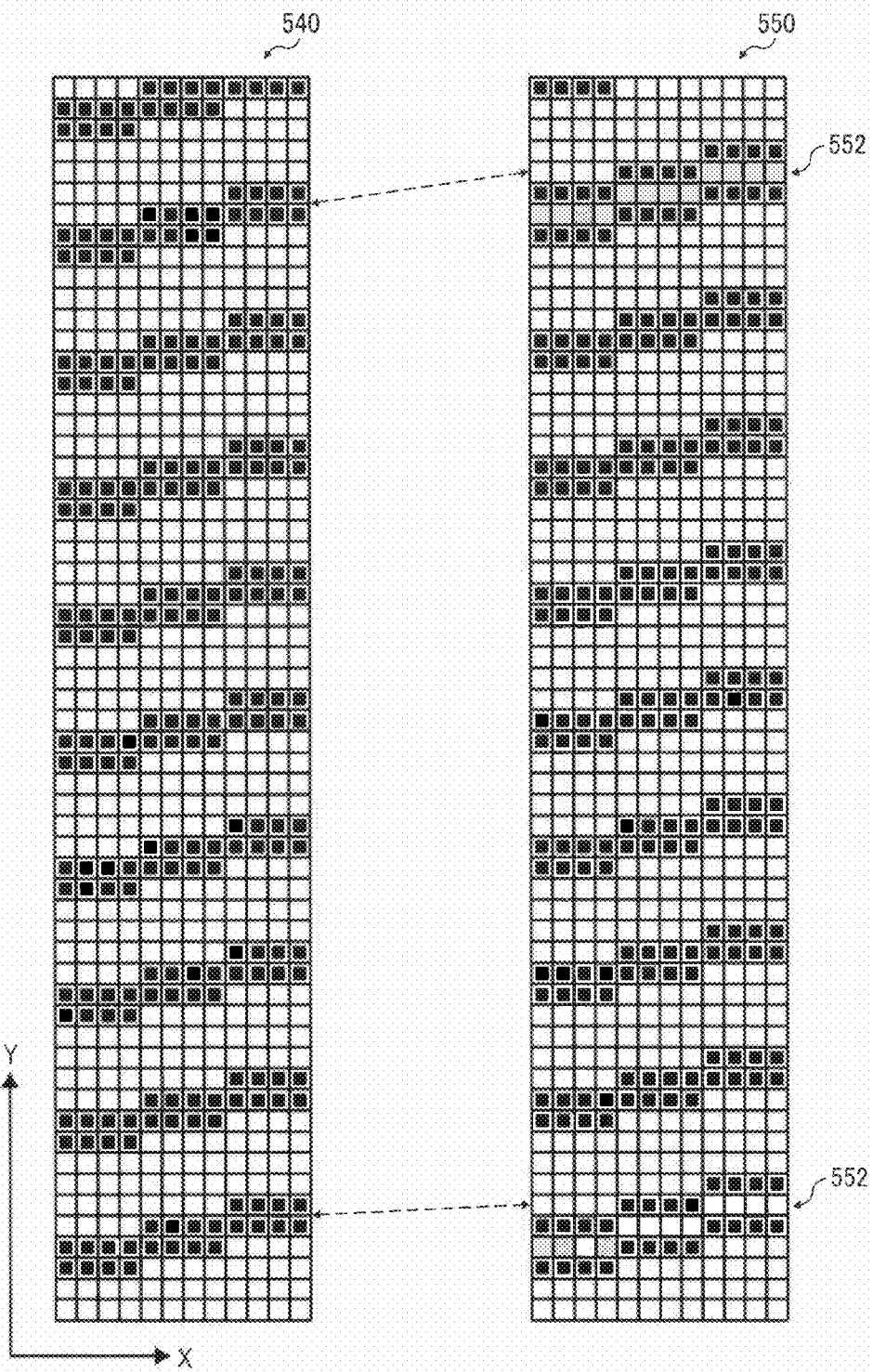
FIG. 8 schematically illustrates still another example of a scaling operation performed by the image processor of FIG. 5.

FIG. 8 schematically illustrates still another example of the scaling operation performed by the image processor 242.

In FIG. 8, a cell grid 540 represents a portion of image data supplied to the pixel inserting section 252 after screening with a diagonal line pattern, and a cell grid 550 represents a corresponding portion of the image data which is vertically enlarged through pixel insertion.

The original data 540 is enlarged to the image data 550 at a scale factor of approximately 102% in the Y direction by inserting lines of additional background pixels 552 after 8 periods of the screen pattern so that each inserted pixel is at an approximate center of the image area.

It is to be noted that, in the image data 550, each of the inserted pixel lines 552 is not on a single scan line. In the present case, the position indicator 254 specifies the insertion position for each scan line address value according to a phase shift of the diagonal line pattern determined by a given offset value, so that additional pixels are inserted diagonally across the image area. The offset value used in such procedure can be derived, for example, from reading the phase information or from calculating based on a screen angle included in the attribute data.

Although the examples of FIGS. 6 through 8 describe cases where the image data is enlarged in the sub-scan direction, it will be appreciated that the scaling operation according to this patent specification can be similarly applied to enlarge an image in the main scan direction.

The scaling operation described above enables fine size adjustment of image data for output to an imaging system. The use of such a size adjustment function is particularly effective in reducing registration errors in duplex printing, where a recording medium shrinks due to heating during fixing. Therefore, it is preferable to provide a list of scale factors for different types of recording medium that have different shrinkage, and an appropriate scale factor is determined by the type of recording media. However, it will be appreciated that the image resizing process according to this specification is not limited to such shrinkage compensation, and may be used for purposes other than this particular application.

Figure 9:
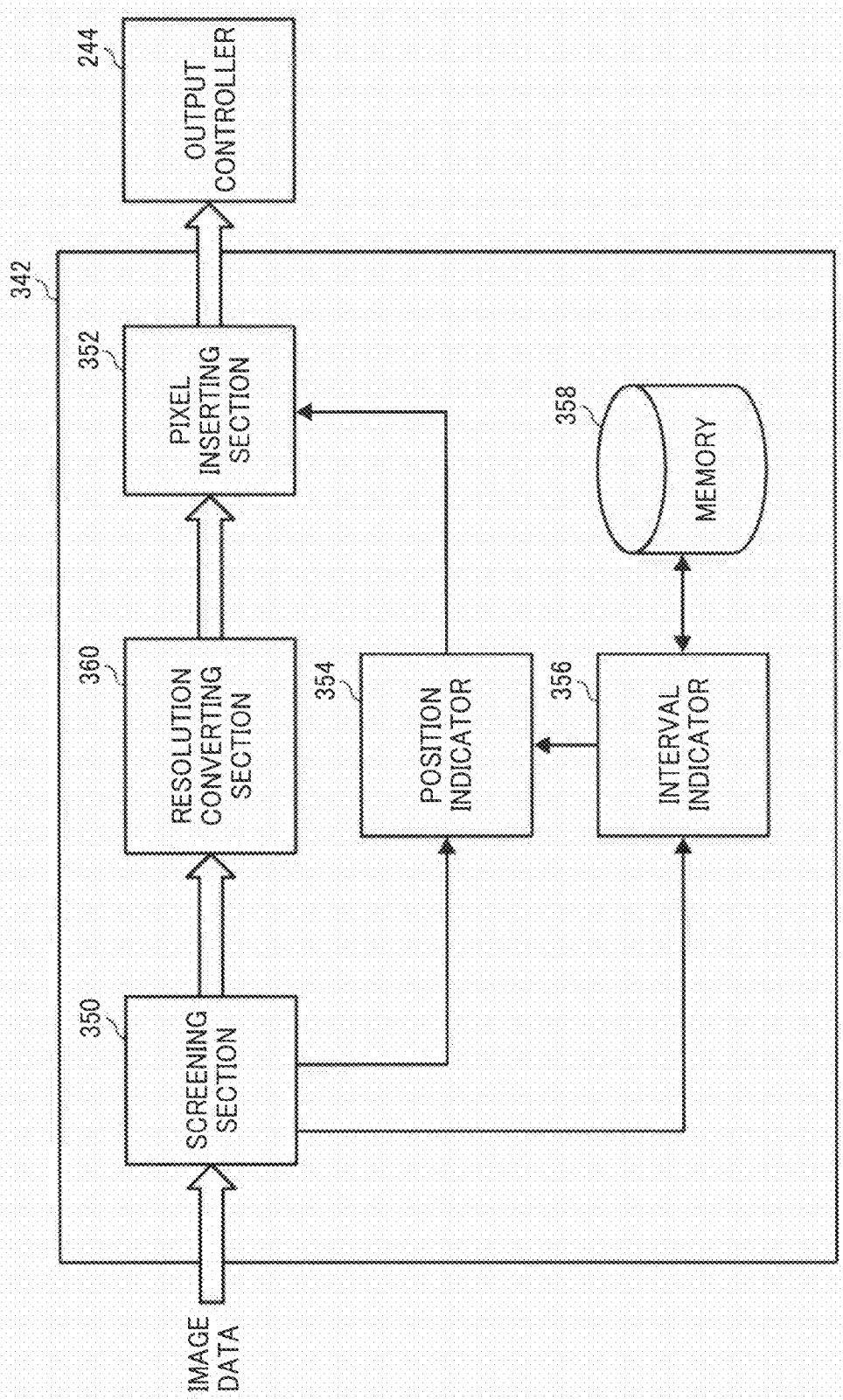
FIG. 9 is a block diagram illustrating another embodiment of the image processor according to this patent specification.

Referring now to FIG. 9, a block diagram illustrating another embodiment of the image processor 342 according to this patent specification is described.

As shown in FIG. 9, the image processor 342 includes a screening section 350, a resolution converting section 360, a pixel inserting section 352, a position indicator 354, an interval indicator 356, and a memory 358.

During operation, the image processor 342 receives continuous tone multilevel image data. The supplied image data first enters the screening section 350.

The screening section 350 converts the image data into a binary representation in a given pixel matrix, using a halftone screen of a regularly repeated arrangement of dots or lines represented by black foreground pixels and white background pixels. This procedure is done for each primary color contained in the image data.

Subsequent to the screening process, the screening section 350 provides attribute values describing the screen pattern used (e.g., type, angle, frequency, etc.) to the position indicator 354 and the interval indicator 356. The screening section 350 also provides phase information of the screen pattern to the position indicator 354, indicating where pixels forming lines or dots of the screen pattern appear in the pixel matrix.

The binary data obtained by the screening process is directed to the resolution converting section 360. The resolution converting section 360 divides every pixel of the image data into multiple sub-pixels to increase the resolution of the original image data in both the main scan and sub-scan directions. The resulting sub-pixels may have the same intensity value as the original pixel. For example, image data of a resolution of 1,200 dpi can be converted to 4,800 dpi high resolution image data by dividing every pixel into 4×4 sub-pixels of the same intensity.

The image data obtained by resolution conversion is directed to the pixel inserting section 352, which serves to enlarge the size of the image data according to a given scale factor. Such a scaling operation is performed in cooperation with the position indicator 354, the interval indicator 356, and the memory 358.

The memory 358 includes a look-up table storing scale factors used for the scaling operation. Preferably, such scale factors are given in terms of the main scan and sub-scan directions, respectively.

The interval indicator 356 retrieves an appropriate scale factor from the memory 358 to determine an interval at which additional pixels are to be inserted in the pixel matrix by calculation based on the scale factor, the attribute data, and the image resolution. Alternatively, such determination may be based on a look-up table, which provides a list of insertion intervals associated with given representative values for the calculation parameters.

The insertion interval determined is output to the position indicator 354. The position indicator 354 specifies a position at which to insert additional pixels in the pixel matrix based on the insertion interval and on the attribute data and phase information supplied from the screening section 350. The position information is output to the pixel inserting section 354.

Receiving the image data from the resolution converting section 360 and the position information from the position indicator 354, the pixel inserting section 352 inserts additional pixels at the insertion positions and correspondingly shifts original pixels in the scaling direction. The image data thus enlarged is transmitted to the output controller 244 to generate a laser control signal.

Figure 10:
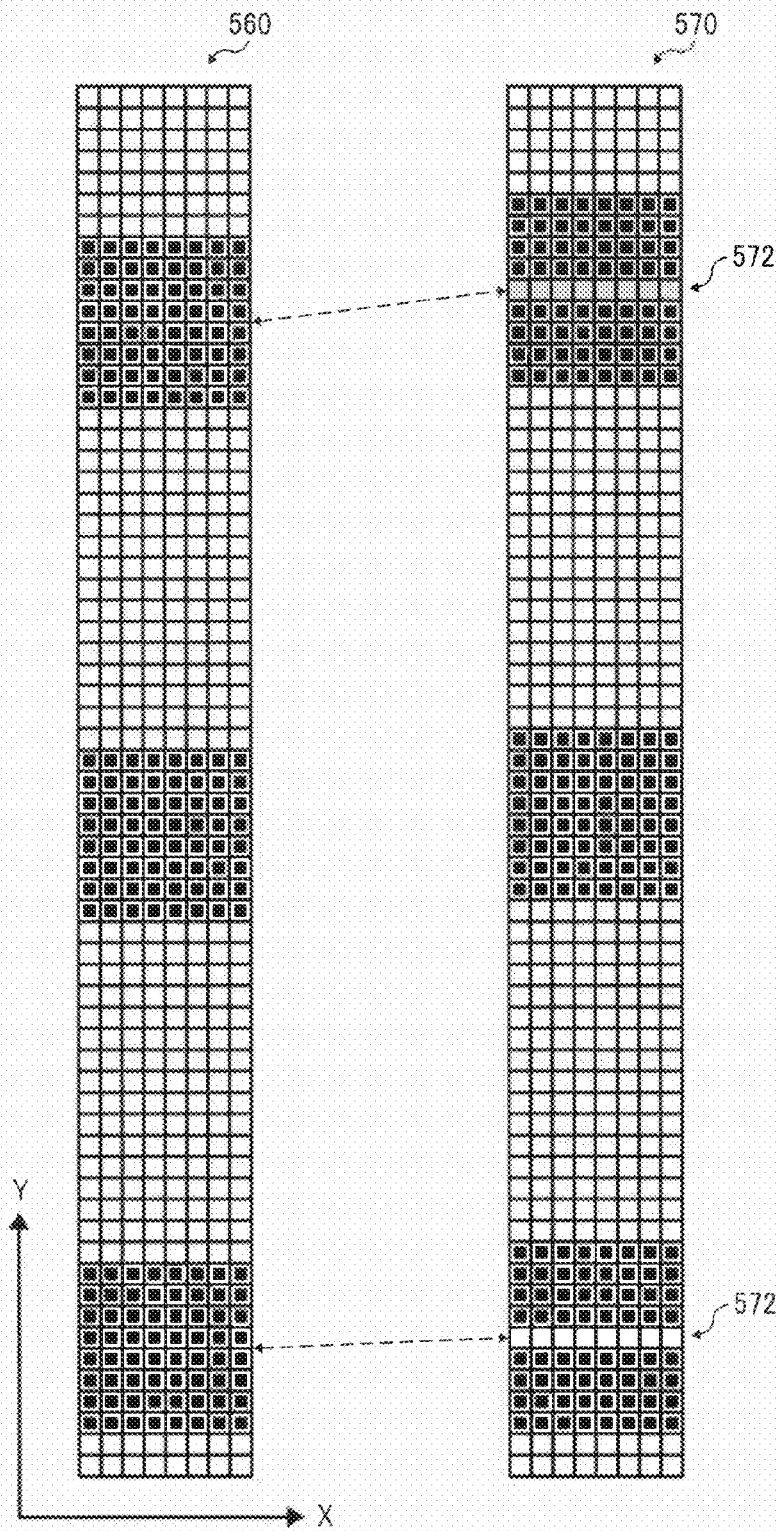
FIG. 10 schematically illustrates an example of a scaling operation performed by the image processor of FIG. 9.

FIG. 10 schematically illustrates an example of the scaling operation performed by the image processor 342.

In FIG. 10, a cell grid 560 represents a portion of image data supplied to the pixel inserting section 352 after screening with a parallel line pattern, and a cell grid 570 represents a corresponding portion of the image data which is vertically enlarged through pixel insertion.

The original data 560 is assumed to result from converting the original image data 500 shown in FIG. 6 to have quadruple the resolution in the X and Y directions, so that the line pattern has a period of 24 lines including 8 lines of foreground pixels forming an image area. The image data 560 is enlarged to the image data 570 at a scale factor of approximately 102% in the Y direction by inserting lines of additional pixels 572 after 2 periods of the screen pattern so that each inserted line is at an approximate center of the image area.

The image processor 342 performs the scaling operation in a manner similar to that described for the image processor 242. With reference to FIG. 9, in the scaling operation, the interval indicator 356 first determines the pattern length n' from the resolution and the screen frequency after resolution conversion, and calculates the insertion interval N' from the pattern length n' and a specified scale factor C. It is to be noted that the pattern length n' is obtained by multiplying the initial pattern length n by a factor of resolution enhancement.

The pattern length n' and the insertion interval N' thus obtained are output to the position indicator 354. The position indicator 354 identifies the insertion position based on the pattern length n', the attribute data, and the phase information of the screen pattern, and provides the timing of pixel insertion to the pixel inserting section 352 handling the image data. The insertion position thus specified is at an approximate center of an image area formed by foreground pixels in the pixel matrix. According to the position indication, the pixel inserting section 352 inserts one background pixel at the specified position.

The image processor according to this patent specification can effectively enlarge the size of image data by periodically inserting additional pixels without causing an artifact commonly known as "banding" on a resulting image. A banding defect refers to an undesirable pattern of repeating streaks appearing on a processed image, which may result from periodically inserting additional pixels in image data.

The image processor of this patent specification suppresses such an artifact by specifying the insertion position for locating the additional pixels and by setting the intensity or tone value of the additional pixels relative to that of neighboring pixels adjacent to the specified insertion position.

Specifically, the additional pixels with relatively low pixel values are positioned at an approximate center of an area formed of pixels having relatively high pixel values. As a low intensity pixel located between high intensity pixels is barely resolved with distinct boundaries in a resulting image, the inserted low intensity pixels are substantially not noticeable, and therefore, do not lead to the formation of a banding pattern even when the pixel insertion is periodically repeated.

Such artifact-suppression capability can be explained in terms of a resolution of image data ("theoretical resolution") and a resolution of an image forming system that outputs a printed image ("effective resolution"). Namely, the above effect may be obtained when the theoretical resolution is higher than the effective resolution at least in the scaling direction.

In general, the effective resolution of an electrophotographic printer is dependent on the spot diameter of the laser beam used in the electrophotographic process, which determines the actual size of one pixel in the output image. On the other hand, the theoretical resolution of image data or pixel density is inversely proportional to the logical size of one pixel or spatial interval between pixels.

In the image processor according to this patent specification, the effective resolution and the theoretical resolution may be determined relative to each other to satisfy the following equation:

$$\omega \geq \lambda \qquad \text{Equation 1}$$

In Equation 1, $\omega$ is the spot diameter of a laser beam defined at a $1/e^2$ intensity point, and $\lambda$ is the logical size of one pixel or spatial interval between pixels, both measured in the scaling direction.

When Equation 1 is satisfied, the laser spot illuminating an image area significantly overlaps an adjacent background area to make indistinct boundaries between the image and background areas, so that the background pixels inserted between the foreground pixels are not resolved in the output image.

In addition, the artifact-suppression capability is enhanced when the image data is converted to have a higher resolution prior to the scaling operation. The resolution conversion increases the frequency at which the inserted pixels appear in the printed image so that the insertions become hardly noticeable to human eyes.

The scaling operation with such artifact-suppression capability is suitable for use with image data processed with a halftone screen, such as vertical/horizontal line patterns or dot patterns, which commonly suffers from artifacts when subjected to periodic pixel insertions or deletions.

Moreover, the scaling operation according to this patent specification can be readily implemented through the use of the screening process, where the insertion position can be determined without complex calculations or significant memory capacity. This leads to a reduced manufacturing cost of the image processor and the imaging system incorporating the size adjustment function.

In the above description, the image data subjected to the scaling operation is assumed to be binary, with pixels of values higher than the given threshold being classified into foreground pixels and pixels of values lower than the given threshold being classified into background pixels. Although such an arrangement is preferable in terms of reducing memory capacity requirements and extending operating life of the photoconductor, the scaling operation according to this patent specification is equally applicable to multilevel image data depending on the performance of the image forming system used in conjunction with the image processor. In the case of processing multilevel image data, pixels to be inserted may have relatively low intensity or tone density values, and be positioned at an approximate center of an image area formed of pixels having relatively high intensity or tone density values.

Although it is assumed that the image processor according to this patent specification is incorporated in an image forming apparatus having multiple imaging functions, use of the image processor as part of a photocopier, a laser printer, or any appropriate imaging device is also contemplated. Further, the image processor according to this patent specification may be constructed on, and integrated into, a semiconductor device such as a large scale integrated (LSI) circuit.

The following experiments and examples are presented in order to more clearly describe the invention and to point out preferred embodiments. They are not, however, intended in any way to limit the present invention and are not to be thus interpreted.

EXPERIMENT 1.1

The aim of Experiment 1.1 is to investigate how the insertion position and the intensity of inserted pixels affect the efficacy of the scaling operation according to this patent specification, involving images created from image data prepared through screening and size adjustment processes. The conditions of the experiment are given in Example 1 as follows.

EXAMPLE 1

Binary image data was prepared through screening process to have a resolution of 1,200 dpi with a horizontal line screen of 200 lpi. Size adjustment was performed on the prepared data using various settings so as to obtain different sets of sample image data each of which is enlarged by 2% from the original.

Figure 11A:
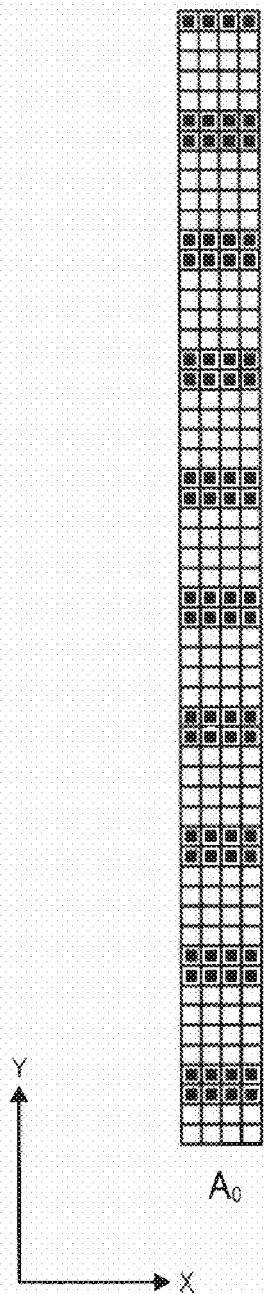
FIGS. 11A and 11B illustrate an experiment conducted to demonstrate efficacy of the image processor of FIG. 5.
Figure 11B:
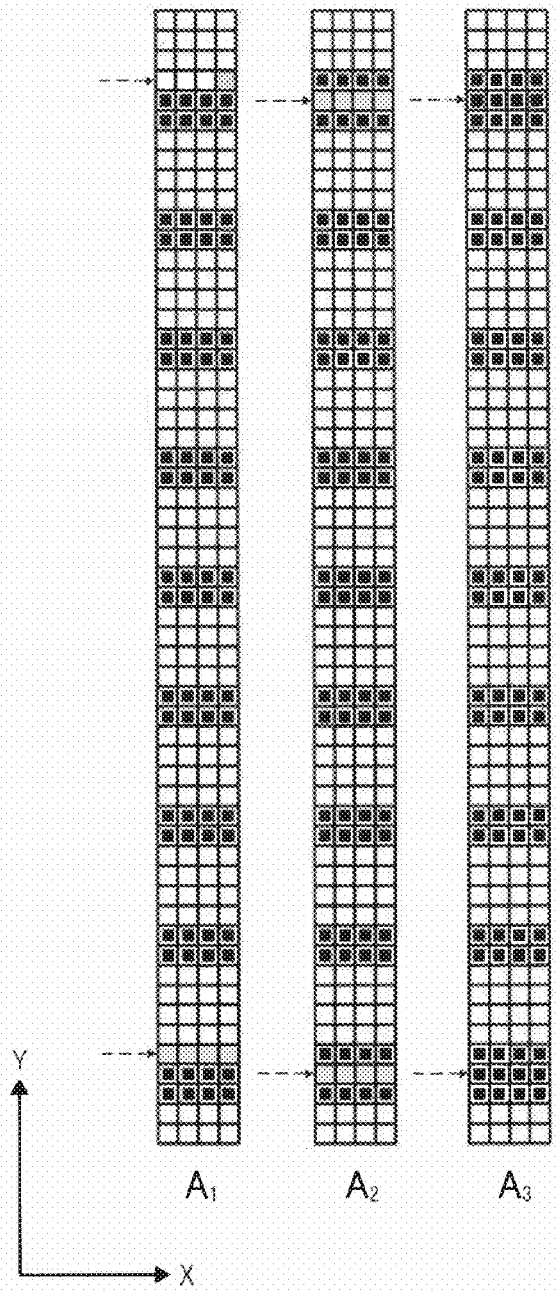

FIG. 11A shows a portion of the initial data ($A_0$), and FIG. 11B shows corresponding portions of the sample data sets ($A_1$, $A_2$, and $A_3$).

As shown in the drawing, the initial data $A_0$ has 2 scan lines of foreground pixels or image area in every 6 scan lines corresponding to 1 screen period. Each of the enlarged versions $A_1$ through $A_3$ has an additional 1 scan line on or across the 2-pixel image area after every 8 screen periods.

The following briefly describes the data samples $A_1$ through $A_3$ obtained in Experiment 1.1.

$A_1$: Each additional scan line was formed of background pixels and inserted next to but not across the 2-pixel image area.

$A_2$: Each additional scan line was formed of background pixels and inserted between the 2-pixel image area.

$A_3$: Each additional scan line was formed of foreground pixels and inserted between the 2-pixel image area.

The data samples $A_1$ through $A_3$ were printed using an electrophotographic printer, imagio Neo C285® manufactured by Ricoh Company Ltd. or its equivalent, with a laser beam of approximately 60 μm in $1/e^2$ diameter in both the main scan and sub-scan directions.

Images obtained in Experiment 1.1 were observed to evaluate whether visual artifacts were present on the image surface. The evaluation was based on a method proposed by Junichi Yoneda, Quantification of Density Variation in Thermal Printing System, FUJIFILM RESEARCH & DEVELOPMENT No. 42, pp. 40-47, 1997.

EXPERIMENT 1.2

The aim of Experiment 1.2 is to investigate how the effective resolution of the image forming apparatus relative to the theoretical resolution of the image data affects the efficacy of the scaling operation according to this patent specification, using images created from image data prepared through screening and size adjustment processes. The conditions of the experiment are given in Comparative Examples 1 through 3 as follows.

COMPARATIVE EXAMPLE 1

The data samples $A_1$ through $A_3$ were prepared through the same process as Experiment 1.1. Printing was carried out using a thermal laser proofer, APPROVAL® XP4 manufactured by Eastman Kodak Company, with a laser beam of approximately 60 μm in $1/e^2$ diameter in both the main scan and sub-scan directions.

COMPARATIVE EXAMPLE 2

The data samples $A_1$ through $A_3$ were prepared through the same process as Experiment 1.1 except that the original data had a resolution of 300 dpi with a horizontal line screen of 50 lpi. Printing was carried out using an electrophotographic printer with a laser beam of approximately 60 μm in $1/e^2$ diameter in both the main scan and sub-scan directions.

COMPARATIVE EXAMPLE 3

The data samples $A_1$ through $A_3$ were prepared through the same process as Experiment 1.1. Printing was carried out using an electrophotographic printer with a laser beam of approximately 15 μm in $1/e^2$ diameter along the main scan and sub-scan directions.

Images obtained in Experiment 2 were observed to evaluate whether visual artifacts were present on the image surface. The evaluation was based on the method used in Experiment 1.1.

Table 1 below provides results for Experiments 1.1 and 1.2.

TABLE 1

|  | $A_1$ | $A_2$ | $A_3$ |
| --- | --- | --- | --- |
| Example 1 | Poor | Good | Poor |
| Comp. Ex. 1 | Poor | Poor | Poor |
| Comp. Ex. 2 | Poor | Poor | Poor |
| Comp. Ex. 3 | Poor | Poor | Poor |

In Table 1, "Good" indicates that the printed image had minor or no banding defects observed, and "Poor" indicates that significant banding defects were present to make the image uncomfortable to view.

The evaluation results for Example 1 show that the artifact-suppression capability varies depending on the insertion position and the intensity value of the inserted pixels. The image obtained from the sample $A_2$ had substantially no observable pattern of undesired streaks, although the pixel insertion was performed at a spatial frequency most likely to cause banding defects. Images obtained from the samples $A_1$ and $A_3$, configured differently from the sample $A_2$ in terms of the insertion position and the intensity value of the inserted pixels, respectively, suffered from significant streak patterns.

The images obtained from the samples $A_1$ through $A_3$ in Comparative Examples 1 through 3 all had significant banding defects. Comparing the evaluation results with those for Example 1, it can be seen that the artifact-suppression capability is not obtained when the effective resolution of the printer relative to the image data resolution does not meet the condition specified according to this patent specification.

ANALYSIS OF EXPERIMENTS 1.1 & 1.2

Images obtained from the data samples $A_1$ through $A_3$ in Example 1 (hereinafter referred to as images $a_1$, $a_2$, and $a_3$, respectively) were examined to determine the maximum reflectivity in image and non-image areas and the width of a single line of the screen pattern to which an additional scan line was added (hereinafter "expanded line").

As for the maximum reflectivity in an image area, there was substantially no difference between the sample images $a_1$ through $a_3$. A difference was observed with respect to the expanded line width, which was narrowest in the image $a_1$ and widest in the image $a_3$. The difference between the expanded line widths effected a difference in the maximum reflectivity in a non-image area between expanded and non-expanded lines, an optical effect called "optical dot gain", so that the maximum reflectivity was greatest in the image $a_1$ and smallest in the image $a_3$. Since the human eye is more sensitive to variations in the maximum reflectivity than to variations in the line width, the sample image $a_1$ had a noticeable pattern of light streaks, the sample image $a_3$ had a noticeable pattern of dark streaks, and the sample image $a_2$ had neither of such banding patterns.

Further, the image obtained from the data sample $A_2$ in Comparative Example 1 (herein referred to as image $ca_2$) and the sample image $a_2$ obtained in Example 1 were visually examined under magnification with a simple microscope.

In the image $ca_2$, the expanded black line was divided by the inserted white pixels and presented as distinct thin black lines. By contrast, the expanded black line was maintained continuous in the image $a_2$ with the inserted line of white pixels hardly resolved.

The difference between the two cases may result from the fact that the electrophotographic printer employed in Example 1 was susceptible to variations in scanning beam spot size and power, properties of the photoconductor, etc., which reduced the effective resolution of the printed image, while the sublimation laser printer employed in Comparative Example 1 produced the image at a relatively high effective resolution with dots and lines reproduced faithful to the image data. This proves that the artifact-suppression capability is obtained when the effective resolution of the image forming apparatus relative to the theoretical resolution of the image data meets the condition determined by Equation 1 given above.

In addition, such an influence of the effective resolution of the image forming apparatus and/or the theoretical resolution of the image data is also demonstrated by comparing Example 1 with Comparative Examples 2 and 3, which did not provide satisfactory image quality.

In Comparative Example 2, Equation 1 was not satisfied since the image data processed had one-quarter the theoretical resolution of that used in Example 1. In Comparative Example 3, although the theoretical resolution was equal to that used in Example 1, the laser beam was one-fourth the diameter of that used in Example 1 so that the effective resolution of the image data did not satisfy Equation 1.

To summarize the results of Experiments 1.1 and 1.2, it has been revealed that the scaling operation according to this patent specification owes its effectiveness to the insertion position specified at the approximate center of the image area. Further, it has also been shown that the artifact-suppression capability is well obtained when the inserted pixels are not resolved into distinct lines, i.e., when the laser beam diameter determining the effective resolution and the theoretical resolution determining the interval between pixels satisfy the condition given by Equation 1.

EXPERIMENT 2

The aim of Experiment 2 is to investigate how the insertion position affects the efficacy of the scaling operation according to this patent specification particularly when the image data is converted to have an increased resolution.

Evaluations were performed on images created from image data prepared through screening, resolution conversion, and size adjustment processes.

The conditions of the experiment are given in Example 2 as follows.

EXAMPLE 2

Binary image data was prepared through screening process to have a resolution of 1,200 dpi with a horizontal line screen of 200 lpi. The prepared data was subjected to resolution enhancement to obtain image data with quadruple the image resolution.

Size adjustment was performed on the image data using various settings so as to obtain different samples of image data, each of which is enlarged by 2% from the original.

Figure 12B:
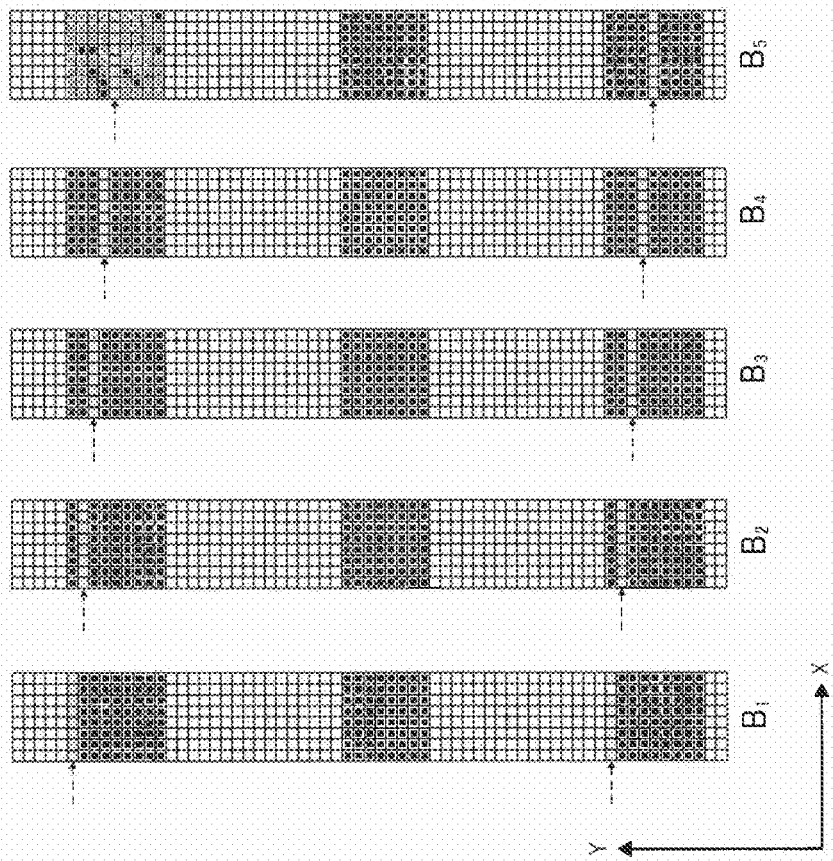
FIGS. 12A and 12B illustrate an experiment conducted to demonstrate efficacy of the image processor of FIG. 9.
Figure 12A:
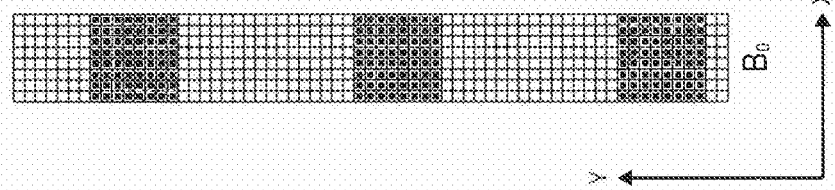

FIG. 12A shows a portion of the initial data ($B_0$), and FIG. 12B shows corresponding portions of the data samples ($B_1$, $B_2$, $B_3$, $B_4$, and $B_5$).

As shown in the drawing, the initial data $B_0$ has 8 scan lines of foreground pixels or image area in every 24 scan lines corresponding to 1 screen period. Each of the enlarged versions $B_1$ through $B_5$ has an additional 1 scan line formed of background pixels on or across the 8-pixel image area after every 2 screen periods.

The following briefly describes the data samples $B_1$ through $B_5$ prepared in Experiment 2.

$B_1$: Each additional scan line was inserted next to but not across the 8-pixel image area.
$B_2$: Each additional scan line was inserted between the first and second scan lines from the end of the 8-pixel image area.
$B_3$: Each additional scan line was inserted between the second and third scan lines from the end of the 8-pixel image area.
$B_4$: Each additional scan line was inserted between the third and fourth scan lines from the end of the 8-pixel image area.
$B_5$: Each additional scan line was inserted between the fourth and fifth scan lines from the end of the 8-pixel image area.

The image data samples $B_1$ through $B_5$ were printed using an electrophotographic printer with a laser beam of approximately 60 μm in $1/e^2$ diameter in both the main scan and sub-scan directions.

Images obtained in Experiment 2 were observed to evaluate whether visual artifacts were present on the image surface. The evaluation was based on the method used in Experiments 1.1 and 1.2.

The evaluation results are shown in Table 2 below.

TABLE 2

|  | $B_1$ | $B_2$ | $B_3$ | $B_4$ | $B_5$ |
| --- | --- | --- | --- | --- | --- |
| Example 2 | Poor | Fair | Fair | Good | Good |

In Table 2, "Good" indicates that the printed image had minor or no banding defects observed, "Fair" indicates that there were some defects observable but not significant, and "Poor" indicates that significant banding defects were present to make the image uncomfortable to view.

The evaluation results for Example 2 show that the artifact-suppression capability varies depending on the insertion position. Images obtained from samples except for the sample $B_1$, where each additional scan line was inserted across the image area, did not suffer significant banding defects and had acceptable image quality.

In particular, the image obtained from the sample $B_5$, which had the inserted scan line across the midpoint of the expanded line, exhibited the highest image quality with substantially no banding defect, showing that the banding defect is suppressed more effectively when the insertion position is closer to the approximate center of the image area.

It has been also noted that the images obtained through resolution enhancement had relatively few banding defects compared to those obtained at the same scale factor without resolution enhancement process. This is because quadrupling the resolution correspondingly reduces the interval between pixel insertions to a quarter so that the frequency of inserted scan lines is too high to be perceived by the human eye.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that, within the scope of the appended claims, the disclosure of this patent specification may be practiced otherwise than as specifically described herein.

Further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Still further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks®, cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image processing system used to process image data formed of multiple original pixels, the system comprising:
    a pixel position indicator configured to indicate pixel insertion positions in the image data such that each successive one of the insertion positions in a sub-scanning direction is at an approximate center of an area formed of pixels having values higher than a given threshold; and
    a pixel inserting unit configured to enlarge a size of the image data by inserting an additional pixel at each of the insertion positions indicated by the pixel position indicator and accordingly shifting the original pixels in a given direction,
    the additional pixel having a value identical to a value of a predetermined background pixel and lower than the given threshold.

2. The image processing system according to claim 1, further comprising an interval indicator configured to determine an interval between the insertion positions in the given direction based on a variable scale factor.

3. The image processing system according to claim 1, further comprising a screening unit configured to generate the image data by applying a given screen pattern to raw data,
    wherein the pixel position indicator determines the pixel insertion positions according to properties of the given screen pattern.

4. The image processing system according to claim 3, wherein the given screen pattern is a regularly repeated arrangement of lines or dots, and the pixel insertion positions are determined based on a period and a phase of the given screen pattern.

5. The image processing system according to claim 1, further comprising a resolution enhancing unit configured to divide every pixel of the image data into multiple sub-pixels to increase a resolution of the image data at least in the given direction prior to pixel insertion.

6. The image processing system according to claim 1, wherein the image data is binary, with pixels of values higher than the given threshold classified into foreground pixels, and pixels of values lower than the given threshold classified into background pixels.

7. The image processing system according to claim 1, wherein the image data is enlarged in at least one of a main scan direction and a sub-scan direction.

8. An image forming apparatus, comprising:
    an image processing system configured to process image data formed of multiple original pixels, the system including:
        a pixel position indicator configured to indicate pixel insertion positions in the image data such that each successive one of the insertion positions in a sub-scanning direction is at an approximate center of an area formed of pixels having values higher than a given threshold; and
        a pixel insertion unit configured to enlarge a size of the image data by inserting an additional pixel at each of the insertion positions indicated by the pixel position indicator and accordingly shifting the original pixels in a given direction,
        the additional pixel having a value identical to a value of a predetermined background pixel and lower than the given threshold; and an electrophotographic system configured to form an image by irradiating a photoconductive surface with a laser beam according to the processed image data.

9. The image forming apparatus according to claim 8, wherein the image processing system further includes an interval indicator configured to determine an interval between the insertion positions in the given direction based on a variable scale factor.

10. The image forming apparatus according to claim 8, wherein the image processing system further includes a screening unit configured to generate the image data by applying a given screen pattern to raw data, and the pixel position indicator determines the pixel insertion positions according to properties of the given screen pattern.

11. The image forming apparatus according to claim 10, wherein the given screen pattern is a regularly repeated arrangement of lines or dots, and the pixel insertion positions are determined based on a period and a phase of the given screen pattern.

12. The image forming apparatus according to claim 8, wherein the image processing system further includes a resolution enhancing unit configured to divide every pixel of the image data into multiple sub-pixels to increase a resolution of the image data at least in the given direction prior to pixel insertion.

13. The image forming apparatus according to claim 8, wherein the image data is binary, with pixels of values higher than the given threshold classified into foreground pixels, and pixels of values lower than the given threshold classified into background pixels.

14. The image forming apparatus according to claim 8, wherein the image data is enlarged in at least one of a main scan direction and a sub-scan direction.

15. The image forming apparatus according to claim 8, wherein the laser beam has a beam diameter equal to or greater than a spatial interval between pixels on the photoconductive surface in the given direction,
the beam diameter being defined at a $1/e^2$ intensity point,
the spatial interval between pixels being inversely proportional to the resolution of the image data.

16. The image forming apparatus according to claim 8, wherein the electrophotographic system is operable to successively produce images on a first side and a second side of a recording medium, and the image processing system enlarges image data for printing on the first side in successive printing.

17. The image processing system according to claim 1, wherein, in the sub-scanning direction, the additional pixel immediately precedes a first one of the multiple original pixels and immediately follows a second one of the multiple original pixels, and
the first one and the second one of the multiple original pixels each have the values higher than the given threshold.

18. The image forming apparatus according to claim 8, wherein, in the sub-scanning direction, the additional pixel immediately precedes a first one of the multiple original pixels and immediately follows a second one of the multiple original pixels, and
the first one and the second one of the multiple original pixels each have the values higher than the given threshold.

* * * * *